(12) United States Patent
Iwayama

(10) Patent No.: US 9,121,693 B2
(45) Date of Patent: Sep. 1, 2015

(54) METHOD AND APPARATUS FOR DETECTING SHAPE OF STRIP-SHAPED MEMBER AND TWO-DIMENSIONAL DISPLACEMENT SENSOR

(75) Inventor: Shinya Iwayama, Kodaira (JP)

(73) Assignee: KABUSHIKI KAISHA BRIDGESTONE, Tokyo (JP)

(*) Notice: Subject to any disclaimer, the term of this patent is extended or adjusted under 35 U.S.C. 154(b) by 64 days.

(21) Appl. No.: 13/820,562

(22) PCT Filed: Sep. 5, 2011

(86) PCT No.: PCT/JP2011/070183
§ 371 (c)(1),
(2), (4) Date: Mar. 18, 2013

(87) PCT Pub. No.: WO2012/029975
PCT Pub. Date: Mar. 8, 2012

(65) Prior Publication Data
US 2013/0169974 A1 Jul. 4, 2013

(30) Foreign Application Priority Data
Sep. 3, 2010 (JP) .................................. 2010-197858

(51) Int. Cl.
*G01B 11/24* (2006.01)
*G01B 11/14* (2006.01)
(Continued)

(52) U.S. Cl.
CPC ............ *G01B 11/14* (2013.01); *B29D 30/3007* (2013.01); *G01B 11/0691* (2013.01); *G01B 11/24* (2013.01); *B29D 2030/0665* (2013.01); *B29D 2030/423* (2013.01)

(58) Field of Classification Search
CPC ...... G01B 11/06; G01B 11/04; G01B 11/022; H04N 7/18; H04N 7/00; G01N 21/16; G01N 21/22; G01N 21/89
USPC .................................................. 356/601, 614
See application file for complete search history.

(56) References Cited

U.S. PATENT DOCUMENTS 4,896,211 A * 1/1990 Hunt et al. ..................... 348/132
5,581,353 A * 12/1996 Taylor ............................ 356/631
(Continued)

FOREIGN PATENT DOCUMENTS

JP A-4-221705 8/1992
JP A-9-14935 1/1997
(Continued)

OTHER PUBLICATIONS

Apr. 9, 2013 International Preliminary Report on Patentability issued in International Application No. PCT/JP2011/070183.
(Continued)

*Primary Examiner* — Tarifur Chowdhury
*Assistant Examiner* — Isiaka Akanbi
(74) *Attorney, Agent, or Firm* — Oliff PLC

(57) ABSTRACT

A two-dimensional displacement sensor includes first and second laser units that emit first laser light incident on the surface of the strip-shaped member from a direction intersecting the thickness direction of the strip-shaped member and second laser light incident on the surface of the strip-shaped member from a direction parallel to the thickness direction of the strip-shaped member, a camera that has a light receiving element for receiving light reflected from the surface of the strip-shaped member and measures the amount of displacement of the surface of the strip-shaped member from the reflected light receiving position detected by the light receiving element, an optical element for focusing the reflected light on the light receiving element, and a switching member for switching the laser light to be incident on the surface of the strip-shaped member between the first laser light and the second laser light.

5 Claims, 6 Drawing Sheets

(51) Int. Cl.
*B29D 30/30* (2006.01)
*G01B 11/06* (2006.01)
*B29D 30/42* (2006.01)
*B29D 30/06* (2006.01)

(56) References Cited

U.S. PATENT DOCUMENTS

| | | | | |
|---|---|---|---|---|
| 5,696,591 | A | * | 12/1997 | Bilhorn et al. ................ 356/429 |
| 6,104,427 | A | * | 8/2000 | Stein et al. ...................... 348/61 |
| 8,149,409 | B2 | * | 4/2012 | Lim et al. ...................... 356/445 |
| 8,462,357 | B2 | * | 6/2013 | Rodrigue et al. ............. 356/610 |
| 2007/0211259 | A1 | * | 9/2007 | Jeon et al. ..................... 356/605 |
| 2008/0123113 | A1 | | 5/2008 | Iwayama |
| 2012/0229816 | A1 | * | 9/2012 | Rodrigue et al. ............. 356/610 |

FOREIGN PATENT DOCUMENTS

| | | |
|---|---|---|
| JP | A-2003-28630 | 1/2003 |
| WO | WO 2006/019070 A1 | 2/2006 |

OTHER PUBLICATIONS

Oct. 25, 2011 International Search Report issued in International Application No. PCT/JP2011/070183 (with translation).

* cited by examiner (a)

(b)

(a)

(b)

METHOD AND APPARATUS FOR DETECTING SHAPE OF STRIP-SHAPED MEMBER AND TWO-DIMENSIONAL DISPLACEMENT SENSOR

TECHNICAL FIELD

The present invention relates to a method and apparatus for detecting the shapes, such as length and joint size, of a strip-shaped member such as a carcass ply and a two-dimensional displacement sensor used in detecting the shape of the strip-shaped member.

BACKGROUND ART

Conventionally known among the apparatuses for measuring the length of strip-shaped tire component members such as carcass plies is the length measuring apparatus for strip-shaped rubber members. Such an apparatus measures the length of a strip-shaped rubber member, such as tread, by sequentially measuring with a one-dimensional laser sensor the gaps between the cut surfaces of the strip-shaped rubber members, which are extruded from the extruder, cut into a fixed length, and conveyed further.

The one-dimensional laser sensor emits laser light having a predetermined spot diameter of the illuminated area from a cutting slant angle direction and detects the reflected light with a light receiving means such as a photoelectric sensor. And the length measuring apparatus measures the length of the strip-shaped rubber members cut into a fixed length by calculating the gap positions, based on the principle that the intensity of reflected light weakens when the light is passed through the gap of the strip-shaped rubber members (see Patent Document 1, for instance).

It should be recognized, however, that the above-mentioned length measuring apparatus of strip-shaped rubber members cannot necessarily perform length measurement at any given position in the width direction of the strip-shaped rubber member because the displacement sensor used is a one-dimensional laser sensor.

To solve this problem, the present inventor has proposed a length measuring apparatus of strip-shaped members employing a two-dimensional displacement sensor as the displacement sensor, thereby enabling the detection of the positions of level difference in the strip-shaped member (starting end and terminating end) in a wide range of the width direction even with a single unit of displacement sensor (see Patent Document 2, for instance).

This length measuring apparatus is configured as shown in FIG. 7. More specifically, a laser light source 81a emits laser light in the form of a line. A two-dimensional displacement sensor 81 is equipped with a displacement measuring means 81b having a CCD camera that measures the amount of displacement of a tire component member 80 from a light receiving position of laser light reflected from the surface of the tire component member 80. Thus, a line beam at a predetermined angle oblique to the length direction of the tire component member 80 is emitted to the tire component member 80 that is applied around a building drum 82 rotating at a predetermined speed. At the same time, the two-dimensional displacement sensor 81 measures the positions of the starting end 80a and the terminating end 80b of the tire component member 80 by receiving the reflected light from the illuminated area.

As disclosed in the Patent Document 2, the positions of the starting end 80a and the terminating end 80b of the tire component member 80 can be measured over the whole width thereof by two units of two-dimensional displacement sensors 81, 81 which are disposed on their respective width end sides of the tire component member 80.

RELATED ART DOCUMENT

Patent Document

Patent Document 1: Japanese Unexamined Patent Application Publication No. 2003-28630
Patent Document 2: WO 2006/019070 A1

SUMMARY OF THE INVENTION

Problem to be Solved by the Invention

It should be noted that scattering light has normally been the light used as reflected light incident on the light receiving element such as a CCD camera. Yet, the treated members (members having cords coated with treated rubber), such as carcass plies or belts, have uneven surface with raised portions containing cords within and recessed portions containing no cords within and hence present gloss in the valleys and slopes. As a result, the scattering light suffers a drop in the luminance of the reflected light because of an increased proportion of totally reflected light.

On the other hand, the rubber members, such as the tread, have minor unevenness on the surface because of the surface roughness which is higher than that of resin and the like, but generally have few glossy portions on the surface. That is, the rubber members, such as the tread, produce higher intensity of reflected light than the above-described treated members. And this presents a problem of difference in measuring accuracy of the two-dimensional displacement sensor between the treated members and the rubber members such as the tread.

The present invention has been made to solve the foregoing problem, and an object thereof is to provide a method and apparatus for detecting the shape of a strip-shaped member by accurately measuring the amounts of displacement of the surface of a strip-shaped tire component member regardless of the type of tire component member and a two-dimensional displacement sensor to be used preferably in the detection of the shape of such strip-shaped members.

Means for Solving the Problem

The inventor has reached the present invention through careful investigations. He discovered that, for treated members, the most satisfactory luminance can be obtained by an optical system structured such that, as shown in FIG. 8A, laser light is emitted to the surface of the treated member 40T at an incident angle $\theta_T$ of 45 to 65 degrees and the totally reflected light reflected at the same angle $\theta_T$ is focused on a light receiving element such as a CCD camera and that, for members other than treated members, the most satisfactory luminance can be obtained by an optical system structured such that, as shown in FIG. 8B, laser light is emitted to the surface of the member 40G other than the treated member at an incident angle of 90 degrees (normal direction) and the scattering light in the direction $\theta_G$ of −45 degrees is focused on a light receiving element such as a CCD camera.

That is, a first aspect of the invention provides a two-dimensional displacement sensor which includes an emission means for emitting first laser light incident on the surface of a strip-shaped member from a direction intersecting the thickness direction of the strip-shaped member and emitting second laser light incident on the surface of the strip-shaped member from a direction parallel to the thickness direction of the strip-shaped member, a displacement measuring means having a light receiving element for receiving light reflected from the surface of the strip-shaped member and measuring an amount of displacement of the surface of the strip-shaped member from the reflected light receiving position detected by the light receiving element, an optical element for focusing the reflected light on the light receiving element, and a switching means for switching the laser light to be incident on the surface of the strip-shaped member between the first laser light and the second laser light.

Accordingly, the amount of displacement of the surface of the strip-shaped member can be measured accurately regardless of the type of strip-shaped member. Thus the two-dimensional displacement sensor of the present invention enables the detection of the length of the strip-shaped member or the joint size (butt joint, overlap joint) of the strip-shaped member by measuring the positions of the cut surfaces of the strip-shaped member. Therefore, the shape of the strip-shaped member can be detected with excellent accuracy.

A second aspect of the invention provides a two-dimensional displacement sensor in which the emission means includes a laser light emission means for emitting laser light in the form of a line, a beam splitter for splitting laser light emitted from the laser light emission means into the first laser light and the second laser light, and a mirror for reflecting the first laser light to be incident from a direction intersecting the thickness direction of the strip-shaped member.

By adopting a structure as described above, the amount of displacement of the surface of the strip-shaped member can be measured accurately using a single unit of laser light emission means (laser). This can simplify the apparatus of the invention.

A third aspect of the invention provides a two-dimensional displacement sensor in which the emission means includes a first laser for emitting the first laser light and a second laser for emitting the second laser light. In this two-dimensional displacement sensor, the first and second laser lights are the laser lights in the form of a line, and the switching means drives and controls either one of the first laser and the second laser only.

As a result, a switch between the first laser and the second laser can be made with certainty for emission to the surface of the strip-shaped member. Therefore, the measurement accuracy of the amount of displacement of the surface of the strip-shaped member can be improved.

A fourth aspect of the invention provides a two-dimensional displacement sensor which further includes a mirror for reflecting the emitted light of the first laser light to be incident from a direction intersecting the thickness direction of the strip-shaped member.

Thus, by the use of a simple structure, the incident direction of the emitted light from the first laser can be made to intersect the thickness direction of the strip-shaped member. This can simplify the apparatus of the invention.

A fifth aspect of the invention provides a two-dimensional displacement sensor which further includes a beam splitter for transmitting the emitted light of the first laser between the first laser and the mirror and reflecting the reflected light of the second laser.

In this manner, provision of a beam splitter will further simplify the apparatus of the invention by reducing the number of optical elements.

A sixth aspect of the invention provides a two-dimensional displacement sensor which further includes a third laser disposed in a position symmetrical to the first laser with respect to the second laser, a second mirror for reflecting emitted light from the third laser to be incident from a direction intersecting the thickness direction of the strip-shaped member, and a second beam splitter for transmitting emitted light from the third laser between the third laser and the second mirror and reflecting reflected light from the first laser. In this two-dimensional displacement sensor, the switching means drives and controls the third laser when driving and controlling the first laser.

Thus, even when there is shadow, the amount of displacement of the surface of the strip-shaped member can be measured with accuracy by using one of the images of reflected light from the first laser and the third laser because the one of the images has no missing portion.

A seventh aspect of the invention provides a two-dimensional displacement sensor which further includes an electronic shutter between the beam splitter and the mirror and another electronic shutter between the second beam splitter and the second mirror.

As a result, the detection accuracy can be improved because the number of optical elements can be reduced and the entry of unnecessary reflected light into the camera can be prevented.

An eighth aspect of the invention provides an apparatus for detecting the shape of a strip-shaped member, which includes a two-dimensional displacement sensor as recited in the first aspect above, a shifting means for shifting the two-dimensional displacement sensor relative to the strip-shaped member in the length direction of the strip-shaped member, and a shape detecting means for detecting the shape of the strip-shaped member based on the amount of displacement of the strip-shaped member measured by the two-dimensional displacement sensor. In this apparatus for detecting the shape of a strip-shaped member, the laser light emission means, the first and second lasers, or the first to third lasers emit laser light in the form of a line extending in a direction oblique to the length direction of the strip-shaped member on the surface of the strip-shaped member.

Thus, the shapes, such as length and joint size, of strip-shaped members can be detected with accuracy regardless of the types of the strip-shaped members.

A ninth aspect of the invention provides an apparatus for detecting the shape of a strip-shaped member in which the laser light from the laser light emission means, the laser light from the first and second lasers, or the laser light from the first to third lasers are emitted through their respective Powell lenses.

The Powell lens 11P is a lens designed to transform incident light having a gaussian profile intensity distribution into light having a nearly uniform intensity distribution. By the use of them, the drop in luminance at the ends of the member can be prevented, so that the measurement accuracy can be further improved.

A tenth aspect of the invention provides a method for detecting the shape of a strip-shaped member which includes the steps of emitting laser light in the form of a line on a surface of the strip-shaped member, detecting an amount of displacement of the surface of the strip-shaped member by receiving reflected light of the laser light from the surface of the strip-shaped member, and measuring the amount of displacement of the surface of the strip-shaped member while shifting the laser light and the light receiving element relative to the strip-shaped member in the length direction of the strip-shaped member. In this method, the emission direction of laser light is changed such that the incident direction of the laser light intersects the thickness direction of the strip-shaped member when the strip-shaped member is a treated member or the incident direction of the laser light runs parallel to the thickness direction of the strip-shaped member when the strip-shaped member is a member other than a treated member.

Thus, the shapes, such as length and joint size, of strip-shaped members can be detected with accuracy regardless of the types of the strip-shaped members.

It is to be understood that the foregoing summary of the invention does not necessarily recite all the features essential to the invention, and subcombinations of all these features are intended to be included in the invention.

BEST MODE FOR CARRYING OUT THE INVENTION

The invention will now be described based on preferred embodiments which do not intend to limit the scope of the claims of the present invention but exemplify the invention. All of the features and the combinations thereof described in the embodiments are not necessarily essential to the invention.

First Embodiment

Figure 1:
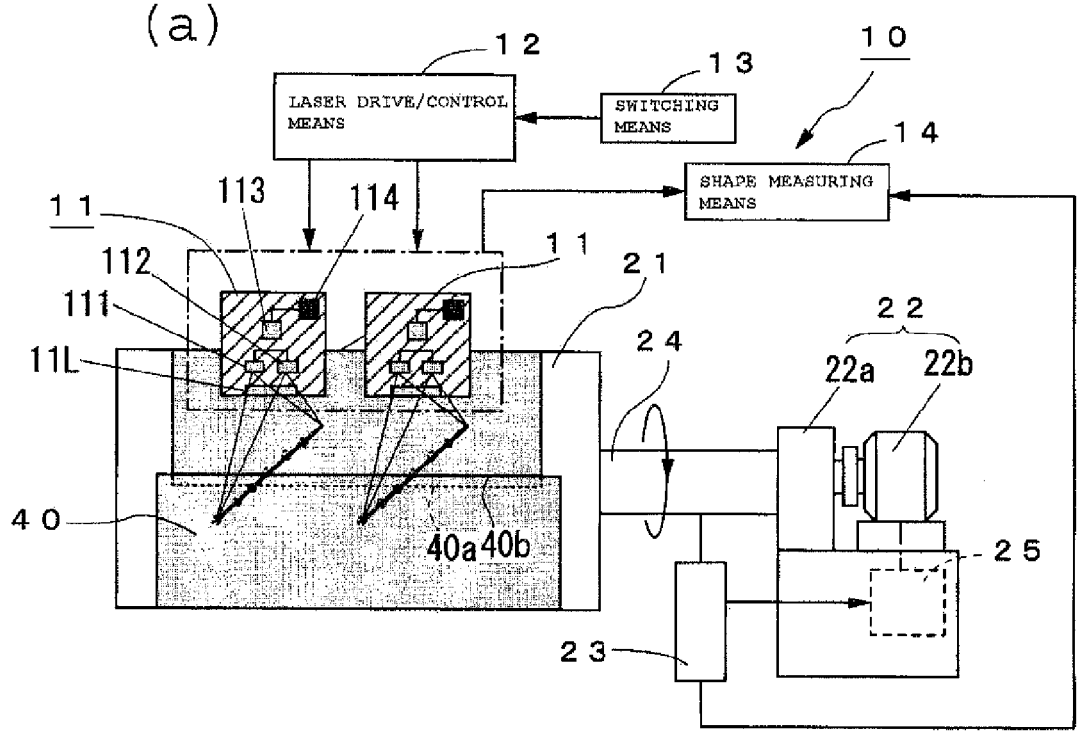
FIG. 1 is schematic illustrations of a length measuring apparatus of tire component members according to a first embodiment of the invention.
Figure 1:
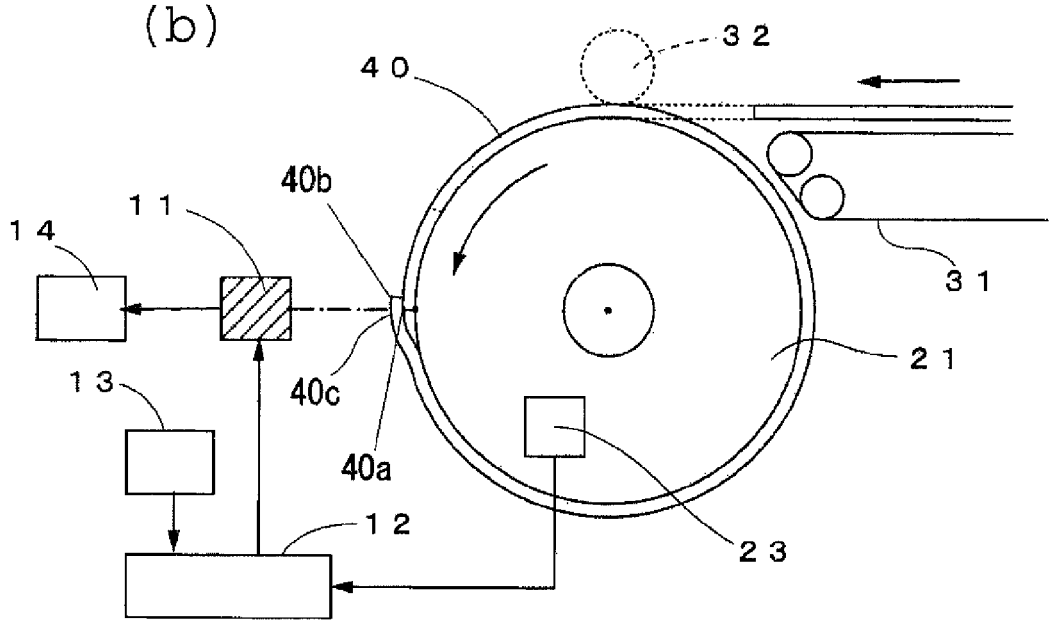
Figure 2:
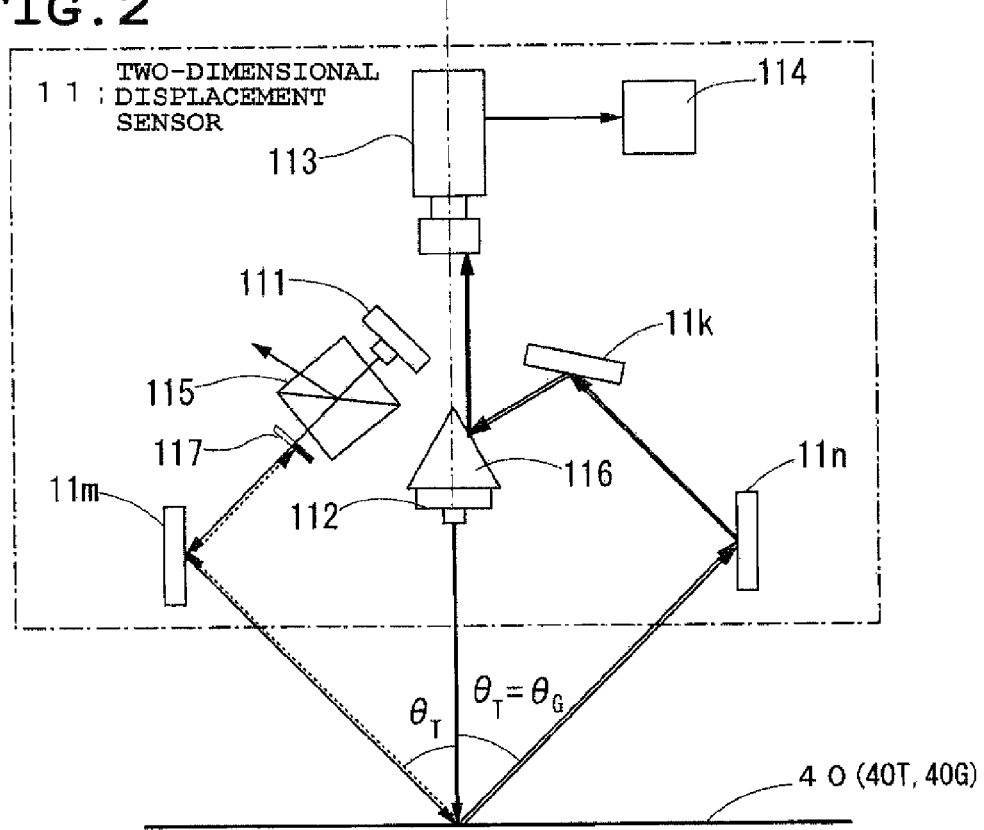
FIG. 2 is an illustration showing a configuration of a two-dimensional displacement sensor according to the first embodiment of the invention.

FIGS. 1A and 1B are schematic illustrations of a length measuring apparatus of tire component members (hereinafter referred to as "length measuring apparatus") 10 according to a first embodiment of the invention. FIG. 2 is an illustration showing a configuration of a two-dimensional displacement sensor 11 according to the invention.

The length measuring apparatus 10 includes two units of two-dimensional displacement sensors 11, 11, a laser drive/control means 12, a switching means 13, a shape measuring means 14, a building drum 21, a drum rotating unit 22, a rotary encoder 23, and a shifting means. It to be noted that the switching means 13 may be incorporated into the laser drive/control means 12.

The shifting means of the length measuring apparatus 10 in this embodiment is equipped with the building drum 21, the drum rotating unit 22, and the rotary encoder 23. The building drum 21, the drum rotating unit 22, and the rotary encoder 23 are constituent elements of a tire building machine which forms a green tire by applying strip-shaped tire component members, such as carcass plies, belts, and tread, in succession into a stack around the periphery of the building drum 21.

As shown in FIGS. 1A and 1B, the building drum 21 is a radially expansible and contractible cylindrical member connected to an end of the main shaft 24 of the tire building machine. And a strip-shaped tire component member 40 brought on a conveyor 31 installed in the rear of the building drum 21 is applied one by one to the peripheral surface thereof, pressed by a pressing roller 32. Reference numeral 40a refers to the starting end of the strip-shaped tire component member 40 applied to the building drum 21.

The strip-shaped tire component member 40 applied to the building drum 21 moves in the direction of rotation of the building drum 21 together with the building drum 21. The moving direction of the strip-shaped tire component member 40 is the length direction of the strip-shaped tire component member 40.

The length of the strip-shaped tire component member 40 is nearly equal to the circumferential length of the building drum 21. Therefore, as the building drum 21 further rotates, a joint portion 40c will be formed by the starting end 40a and the terminating end 40b of the strip-shaped tire component member 40. The illustration here shows a joint portion 40c with the starting end 40a and the terminating end 40b overlapping each other, but the joint portion may be a gap between the starting end 40a and the terminating end 40b or one without the gap or the overlap therebetween.

The drum rotating unit 22, equipped with a drive motor 22b connected to the main shaft 24 via a speed changer 22a, rotates the main shaft 24, which is the rotating shaft of the building drum 21, at a predetermined speed.

The rotary encoder 23 is a rotational position sensor for detecting the rotation of the main shaft 24. The rotary encoder 23 not only detects the rotational position of the building drum 21, but also outputs a pulse signal to a building drum control unit 25, which controls the rotation speed of the building drum 21, and the shape measuring means 14 at every rotation of a predetermined angle of the building drum 21. In this embodiment, the rotary encoder 23 used is an A- and B-phase output type rotary encoder, but it may be an A-, B-, and Z-phase output type rotary encoder.

The two-dimensional displacement sensor 11, as shown in FIG. 2, includes first and second laser units 111, 112 as emission means, a camera 113, a measuring unit 114, first and second mirrors 11m, 11n, a first beam splitter 115, an auxiliary mirror 11k, a prism 116, and a liquid-crystal shutter 117 as an electronic shutter. Reference numeral 11L represents a group of optical elements, the first mirror 11m being an optical element of the emission unit, the second mirror 11n the auxiliary mirror 11k, the prism 116, and the liquid-crystal shutter 117 being optical elements of the light receiving unit, and the first beam splitter 115 being a common optical element of the emission unit and the light receiving unit.

The first laser unit 111 is so disposed as to emit laser light (first laser light) in a direction intersecting the thickness direction of the strip-shaped tire component member 40 which is the object to be measured.

The second laser unit 112 is so disposed as to emit laser light (second laser light) in a direction parallel to the thickness direction (direction normal to the surface) of the strip-shaped tire component member 40.

Each of the first and second laser units 111, 112 emits a line beam extending in a direction oblique to the length direction, or the moving direction, of the strip-shaped tire component member 40 onto the surface of the strip-shaped tire component member 40, which is the object to be measured, following a control signal from the laser drive/control means 12. The oblique angle of the line beam of the first laser unit 111 and the oblique angle of the line beam of the second laser unit 112 are set such that the line beam of the first laser unit 111 covers the left half of the strip-shaped tire component member 40, and the line beam of the second laser unit 112 the right half thereof.

It should be noted that, in this embodiment, the laser unit to be driven is selected according to the type of the strip-shaped tire component member 40 to be measured. While one of the first laser unit 111 and the second laser unit 112 is being driven, the other is not driven.

The camera 113, provided with two-dimensionally arranged CCD elements, is located on the side of the first and second laser units 111, 112 opposite to the strip-shaped tire component member 40 on an extended line of the laser light direction of the second laser unit 112 and captures the image of the surface of the strip-shaped tire component member 40 by receiving the reflected light of the line beam from the illuminated section.

The measuring unit 114, which is coupled to the camera 113, measures the amount of displacement of the strip-shaped tire component member 40 from the reference position, using the reflected light detecting position in the image captured by the camera 113. At this time, the measuring unit 114 samples the detection signal from the camera 113 in synchronism with the pulse signal from the rotary encoder 23 and measures the amount of displacement of the strip-shaped tire component member 40 from the reference position from the sampled data.

Note that, in this embodiment, the reference position used is the surface of the building drum 21 without the strip-shaped tire component member 40 wrapped around.

The first beam splitter 115 transmits a part of the laser light emitted from the first laser unit 111 and reflects another part thereof.

The first mirror 11m, which is located between the first beam splitter 115 and the strip-shaped tire component member 40 in the emission direction of the first laser unit 111, is disposed such that the reflecting surface thereof reflects the laser light (transmitted light) from the first laser unit 111 having passed through the first beam splitter 115 and the incident angle of the transmitted light on the tire component member 40 becomes $\theta_T$. In this embodiment, $\theta_T$ is 45 degrees. In other words, the first mirror 11m is so oriented that the reflecting surface thereof is perpendicular to the surface of the tire component member 40.

It is to be noted that the scattering light (scattering light of $\theta_G = -45$ degrees shown in broken lines in FIG. 2) scattered in the direction of the first mirror 11m and reflected by the first mirror 11m of the laser light of the second laser unit 112 is blocked by the liquid-crystal shutter 117 as will be described later.

The second mirror 11n and the auxiliary mirror ilk reflect the reflected light (totally reflected light of $\theta_T = 45$ degrees) of laser light from the first laser unit 111 and the scattering light (scattering light of $\theta_G = 45$ degrees) scattered in the direction opposite to the first mirror 11m of the laser light from the second laser unit 112, thereby causing the reflected light and the scattering light to be incident on the prism 116. The second mirror 11n is located on the side of the tire component member 40, whereas the auxiliary mirror ilk is located on the side of the camera 113. Note that the second mirror 11n is also oriented such that the reflecting surface thereof is perpendicular to the surface of the tire component member 40.

The prism 116, located between the second laser unit 112 and the camera 113, reflects the reflected light from the auxiliary mirror 11k, thereby providing an image to the camera 113.

The liquid-crystal shutter 117, located between the first mirror 11m and the first beam splitter 115, opens and closes in such a manner that the transmitted light of laser light from the first laser unit 111 is passed while the reflected light of laser light from the second laser unit 112 is blocked.

Figure 3:
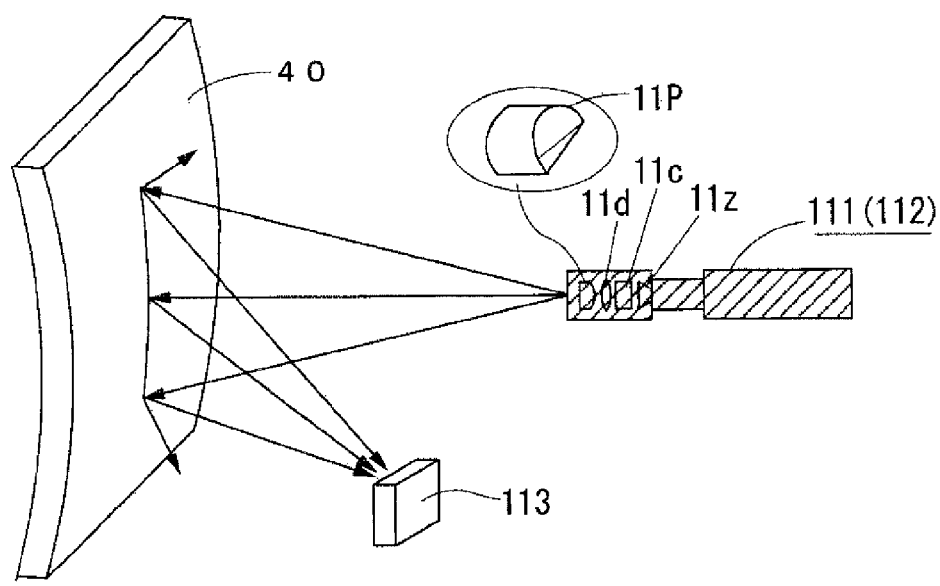
FIG. 3 is an illustration showing another example of the optical system of the two-dimensional displacement sensor.

In the conventional art, because of the tire component member 40 wrapped around the building drum 21, the intensity of the laser light tends to drop at the ends of the line beam, and also the reflected light does not easily get focused (form an image) at the camera 113. In the present embodiment, therefore, a Powell lens 11P is provided in each of the first and second laser units 111, 112, as shown in FIG. 3, so that the intensity of reflected light incident on the camera 113 is raised.

The Powell lens 11P is a lens for transforming light having a gaussian profile intensity distribution into light having a nearly uniform intensity distribution. With laser light from a semiconductor laser 11z passed through the Powell lens 11P, it is possible to effectively reduce the drop in intensity of the laser light at the ends of the line beam.

It should be appreciated that a collimator lens 11c and a condensing lens 11d may be disposed between the semiconductor laser 11z and the Powell lens 11P of the first and second laser units 111, 112. Then the effect of reducing the drop in intensity of the laser light can be further enhanced with the result that clearer images of the strip-shaped tire component member 40 can be obtained.

The laser drive/control means 12 drives one of the semiconductor lasers 11z, 11z of the first and second laser units 111, 112.

The switching means 13 switches between a semiconductor laser 11z of one laser unit and a semiconductor laser 11z of the other laser unit, which is to be driven by the laser drive/control means 12, by controlling the laser drive/control means 12.

The shape measuring means 14 finds the position of level difference (stepped position) on the surface of the strip-shaped tire component member 40 using the data on the amount of displacement of the strip-shaped tire component member 40 from the surface of the building drum 21 measured by the measuring unit 114 of the two-dimensional displacement sensors 11, 11, and determines the positions of the starting end 40a and the terminating end 40b of the strip-shaped tire component member 40 relative to the position of level difference and the length of the strip-shaped tire component member 40.

Next, a description will be given of a method for measuring the length of a strip-shaped tire component member 40 using a length measuring apparatus 10 according to the present embodiment.

Firstly, as shown in FIG. 1B, a strip-shaped tire component member 40 is conveyed to the superior part of the building drum 21 by the conveyor 31 running at the same speed as the rotation speed of the building drum 21, and the strip-shaped tire component member 40 is applied to the periphery of the building drum 21 one at a time. The strip-shaped tire component member 40 applied to the peripheral surface of the building drum 21 one at a time is wound around the building drum 21 as it is moved in the length direction thereof and bent in arcs along with the rotation of the building drum 21.

When the strip-shaped tire component member 40 conveyed to this point is a treated member 40T, such as a carcass ply or a belt, the switching means 13 drives and controls the semiconductor lasers 11z, 11z of the first laser units 111, 111 of the two-dimensional displacement sensors 11, 11 by controlling the laser drive/control means 12. At this time, the semiconductor lasers 11z, 11z of the second laser units 112, 112 remain in the off state.

As shown in FIG. 2, a part of laser light emitted from the first laser unit 111 of the two-dimensional displacement sensor 11 passes through the first beam splitter 115 and the liquid-crystal shutter 117 in the open state, then gets reflected by the first mirror 11m, and hits the surface of the treated member 40T at an incident angle $\theta_T$ of 45 degrees.

Of the reflected light of laser light hitting the surface of the treated member 40T, the totally reflected light, whose angle of reflection $\theta_T$ is 45 degrees, is reflected successively by the second mirror 11n and the auxiliary mirror ilk and enters the prism 116. From there, the totally reflected light is emitted in the direction of the camera 113 and forms an image on the COD elements of the camera 113. The measuring unit 114 of the two-dimensional displacement sensor 11 samples the detection signal from the camera 113 in synchronism with the pulse signal from the rotary encoder 23, measures the amount of displacement of the treated member 40T from the sampled data, and sends the displacement data to the shape measuring means 14.

The shape measuring means 14 finds the position of level difference on the treated member 40T using these displacement data and determines the positions of the starting end 40a and the terminating end 40b of the treated member 40T relative to the position of level difference and the length of the treated member 40T.

In this manner, when the strip-shaped tire component member 40 is a treated member 40T, the arrangement is such that the laser light is emitted to the surface of the treated member 40T at an incident angle $\theta_T$ of 45 degrees and the totally reflected light reflected at the same angle $\theta_T$ is detected by the camera 113. This improves the detection sensitivity of reflected light such that the accuracy in length measurement of the treated member 40T can be improved markedly.

On the other hand, when the strip-shaped tire component member 40 conveyed to this point is a member other than a treated member (hereinafter referred to as "non-treated member") 40G, such as a top tread, the switching means 13 drives and controls the semiconductor lasers 11z, 11z of the second laser units 112, 112 of the two-dimensional displacement sensors 11, 11 and sets the semiconductor lasers 11z, 11z of the first laser units 111, 111 in the off state.

As shown in FIG. 2, laser light emitted from the second laser unit 112 of the two-dimensional displacement sensor 11 is incident on the non-treated member 40G from a direction parallel to the normal direction of the non-treated member 40G.

Of the scattering light of laser light emitted to the surface of the non-treated member 40G, the scattering light whose angle of reflection $\theta_G$ is 45 degrees is reflected successively by the second mirror 11n and the auxiliary mirror ilk and enters the prism 116. From there, the scattering light is emitted in the direction of the camera 113 and forms an image on the CCD elements of the camera 113. The measuring unit 114 of the two-dimensional displacement sensor 11 samples the detection signal from the camera 113 in synchronism with the pulse signal from the rotary encoder 23, measures the amount of displacement of the non-treated member 40G from the sampled data, and sends the displacement data to the shape measuring means 14.

The shape measuring means 14 determines the positions of the starting end 40a and the terminating end 40b of the non-treated member 40G from these displacement data and the length of the non-treated member 40G in a similar manner as the treated member 40T.

At this time, of the scattering light of laser light emitted to the surface of the non-treated member 40G, the scattering light whose angle of reflection $\theta_G$ is −45 degrees is reflected by the first mirror 11m and heads in the direction of the first beam splitter 115. Yet, since the liquid-crystal shutter 117 disposed between the first mirror 11m and the first beam splitter 115 is in the closed state, the scattering light whose angle of reflection $\theta_G$ is −45 degrees does not enter the camera 113. Hence, the scattering light whose angle of reflection $\theta_G$ is 45 degrees and the scattering light whose angle of reflection $\theta_G$ is −45 degrees do not overlap each other on the CCD elements with the result that the measuring accuracy of the amount of displacement can be improved. It is to be noted that a shield, in the place of the liquid-crystal shutter 117, may be disposed between the first beam splitter 115 and the prism 116 to prevent the scattering light whose angle of reflection $\theta_G$ is −45 degrees from entering the camera 113 in a similar manner.

In this manner, when the strip-shaped tire component member 40 is a non-treated member 40G, the arrangement is such that the laser light is emitted in the normal direction of the non-treated member 40G and the scattering light whose angle of reflection $\theta_G$ is 45 degrees is detected by the camera 113. This improves the detection sensitivity of reflected light such that the accuracy in length measurement of the non-treated member 40G can also be improved markedly.

Each of the first and second laser units 111, 112 in this embodiment emits a line beam extending in a direction oblique to the length direction, or the moving direction, of the strip-shaped tire component member 40 onto the surface of the strip-shaped tire component member 40. Also, the line beam of the first laser unit 111 is so arranged as to cover the left half of the strip-shaped tire component member 40, and the line beam of the second laser unit 112 the right half thereof. Therefore, it is possible to determine the position of the starting end 40a, the position of the terminating end 40b, and the length of the strip-shaped tire component member 40 over the whole width thereof.

Also, the length measuring apparatus 10 according to this invention can measure accurately the amount of displacement of both the treated member 40T and non-treated member 40G by simply switching the laser units to be used by the two-dimensional displacement sensor 11. Therefore, there is no need for replacing the two-dimensional displacement sensor for each type of member to be measured, which improves work efficiency.

Also, the two-dimensional displacement sensor 11 according to this invention can measure the amount of displacement of both the treated member 40T and non-treated member 40G, which are each a strip-shaped tire component member 40, with a single camera 113. Therefore, the two-dimensional displacement sensor 11 can be made smaller and lighter, and the length measuring apparatus 10 can also be made smaller. Moreover, the two-dimensional displacement sensor 11 and the length measuring apparatus 10 can be manufactured at lower cost.

In the foregoing embodiment, the incident angle $\theta_T$ of laser light from the first laser unit 111 is 45 degrees. However, this is not always a necessary condition. The arrangement may be such that the incident direction of the laser light intersects the normal direction of the treated member 40T, and it is more preferable if the $\theta_T$ is within a range of 45 to 65 degrees. Also, as for the incident angle of laser light from the second laser unit 112, it may not necessarily be the normal direction. But, as in the embodiment, the normal direction is considered preferable because it may more likely facilitate the arrangement of the optical system.

Also, in the foregoing embodiment, the scattering light whose angle of reflection $\theta_G$ is 45 degrees only is detected out of the scattering light from the non-treated member 40G of the laser light from the second laser unit 112. However, the arrangement may be such that the scattering light whose angle of reflection $\theta_G$ is −45 degrees only is detected. In this case, the liquid-crystal shutter 117 should be placed in the optical path before the prism 116, such as between the auxiliary mirror ilk and the prism 116.

Second Embodiment

Figure 4:
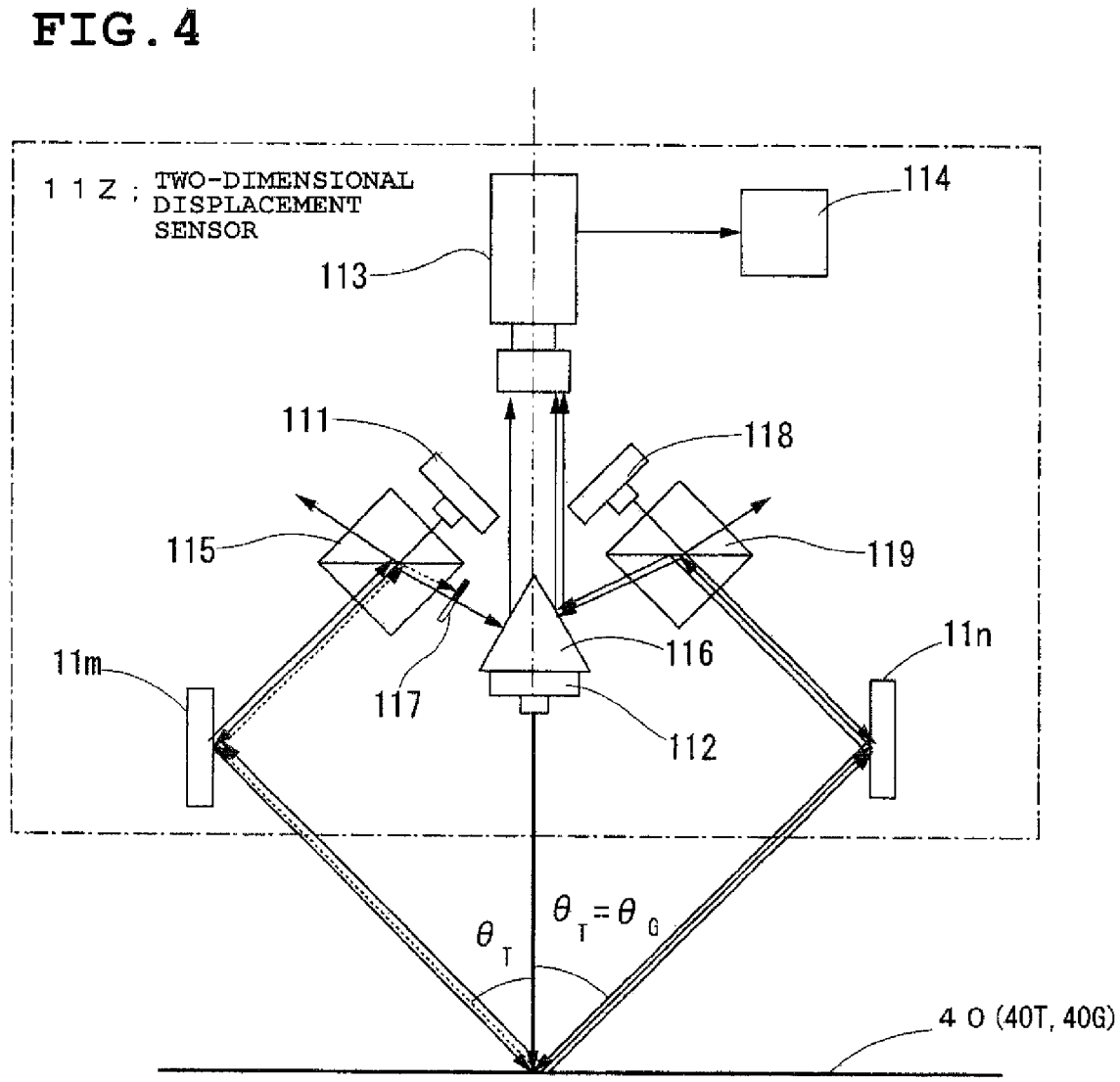
FIG. 4 is an illustration showing a configuration of a two-dimensional displacement sensor according to a second embodiment of the invention.

FIG. 4 is an illustration showing a configuration of a two-dimensional displacement sensor 11Z according to a second embodiment of the invention.

There occurs a problem of "lift shadow" of the member with the two-dimensional displacement sensor 11 of the previously described embodiment because the incident angle of laser light from the first laser unit 111 intersects the normal direction of the treated member 40T. In this embodiment, the problem of "lift shadow" of the member is solved by providing the two-dimensional displacement sensor 11Z with a third laser unit 118 for emitting laser light in a direction intersecting the thickness direction of a treated member 40G, in addition to the first and second laser units 111, 112.

The two-dimensional displacement sensor 11Z is provided not only with a second beam splitter 119, in the place of the auxiliary mirror 11k of the two-dimensional displacement sensor 11, but also with a liquid-crystal shutter 117 between the beam splitter 115 and the prism 116.

The third laser unit 118 and the second beam splitter 119 are disposed in positions axisymmetrical to the first laser unit 111 and the first beam splitter 115 with respect to the optical axis direction of the camera 113. And the laser drive/control means 12 controls such that the laser light from the first laser unit 111 and the laser light from the third laser unit 118 are emitted alternately to the treated member 40T.

It is to be noted that the starting end 40a and the terminating end 40b of the treated member 40T are both the stepped (level difference) points and that the starting end 40a is a rising step and the terminating end 40b a falling step. Therefore, when measuring the shape of the starting end 40a, the image obtained by the laser unit in a position to emit laser light to the higher surface of the stepped portion prior to the arrival of the stepped portion is used, whereas, when measuring the shape of the terminating end 40b, the image with less "missing image" is used out of the image obtained using the first laser unit 111 and the image obtained using the third laser unit 118. The "missing image" meant here is an image resulting from luminance lower than a predetermined reference value.

Figure 5:
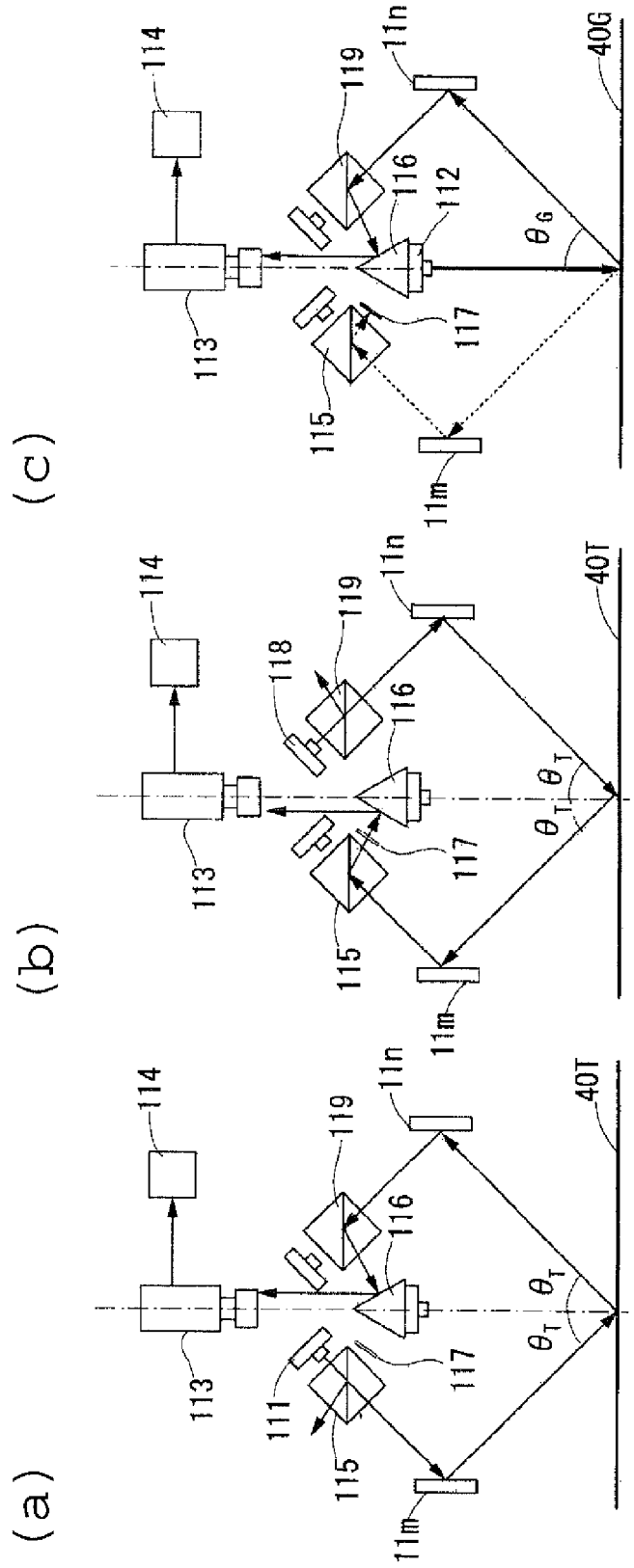
FIG. 5 is illustrations for explaining the operation of the two-dimensional displacement sensor according to the second embodiment.

FIGS. 5A to 5C are illustrations to explain the operation of the two-dimensional displacement sensor 11Z. When the strip-shaped tire component member 40 is a treated member 40T, the amount of displacement of the surface of the treated member 40T is measured by emitting the laser light from the first laser unit 111 and the laser light from the third laser unit 118 alternately to the surface of the treated member 40T, as shown in FIGS. 5A and 5B. At this time, the second laser unit 112 is not operating, and the liquid-crystal shutter 117 is set in the open state.

As shown in FIG. 5A, a part of the laser light emitted from the first laser unit 111 passes through the first beam splitter 115, gets reflected by the first mirror 11m, and hits the surface of the treated member 40T at an incident angle $\theta_T$ of 45 degrees. Of the reflected light of laser light reflected on the surface of the treated member 40T, the totally reflected light whose angle of reflection $\theta_T$ is 45 degrees is reflected successively by the second mirror 11n and the reflecting surface of the second beam splitter 119 and enters the prism 116. From there, the totally reflected light is emitted in the direction of the camera 113 and forms an image on the CCD elements of the camera 113.

On the other hand, as shown in FIG. 5B, a part of the laser light emitted from the third laser unit 111 passes through the second beam splitter 119, then gets reflected by the second mirror 11n, and hits the surface of the treated member 40T at an incident angle $\theta_T$ of −45 degrees. Of the reflected light of laser light reflected on the surface of the treated member 40T, the totally reflected light whose angle of reflection $\theta_T$ is −45 degrees is reflected successively by the first mirror 11m and the reflecting surface of the first beam splitter 115 and enters the prism 116 after passing through the liquid-crystal shutter 117 in the open state. From there, the totally reflected light is emitted in the direction of the camera 113 and forms an image on the CCD elements of the camera 113.

The measuring unit 114 of the two-dimensional displacement sensor 11Z samples the detection signal from the camera 113 in synchronism with the pulse signal from the rotary encoder 23, measures the amount of displacement of the treated member 40T from the sampled data, and sends the displacement data to the shape measuring means 14.

The shape measuring means 14 finds the position of level difference (stepped position) on the treated member 40T using these displacement data and determines the positions of the starting end 40a and the terminating end 40b of the treated member 40T relative to the position of level difference and the length of the treated member 40T.

On the other hand, when the strip-shaped tire component member 40 conveyed to this point is a non-treated member 40G, the first and third laser units 111, 118 are not operating, and the liquid-crystal shutter 117 is set in the closed state.

As shown in FIG. 5C, the laser light emitted from the second laser unit 112 is incident from a direction parallel to the normal direction of the non-treated member 40G.

Of the scattering light of laser light emitted to the surface of the non-treated member 40G, the scattering light whose angle of reflection $\theta_G$ is 45 degrees is reflected successively by the second mirror 11n and the reflecting surface of the second beam splitter 119 and enters the prism 116. From there, the scattering light is emitted in the direction of the camera 113 and forms an image on the CCD elements of the camera 113.

Also, of the scattering light of laser light emitted to the surface of the non-treated member 40G, the scattering light whose angle of reflection $\theta_G$ is −45 degrees is reflected by the first mirror 11m and the reflecting surface of the first beam splitter 115 and heads in the direction of the prism 116. Yet, since the liquid-crystal shutter 117 is in the closed state, the scattering light whose angle of reflection $\theta_G$ is −45 degrees does not enter the camera 113. Hence, the scattering light whose angle of reflection $\theta_G$ is 45 degrees and the scattering light whose angle of reflection $\theta_G$ is −45 degrees do not overlap each other on the CCD elements with the result that the measuring accuracy of the amount of displacement can be improved.

In the second embodiment as described thus far, the laser light from the first laser unit 111 and the laser light from the third laser unit 118 are emitted alternately to the treated member 40T. However, the arrangement may be such that different wavelengths are used for the laser light from the first laser unit 111 and the laser light from the third laser unit 118, for example, 660 nm (red) for the wavelength of the laser light from the first laser unit 111 and 405 nm (blue) for the wavelength of the laser light from the third laser unit 118. In this manner, it becomes possible to emit the laser lights from the two laser units 111 and 118 simultaneously. In this case, the camera 113 to be used is a color CCD camera. And two kinds of images, namely, red and blue images, can be obtained as images captured by the camera 113.

Third Embodiment

Figure 6:
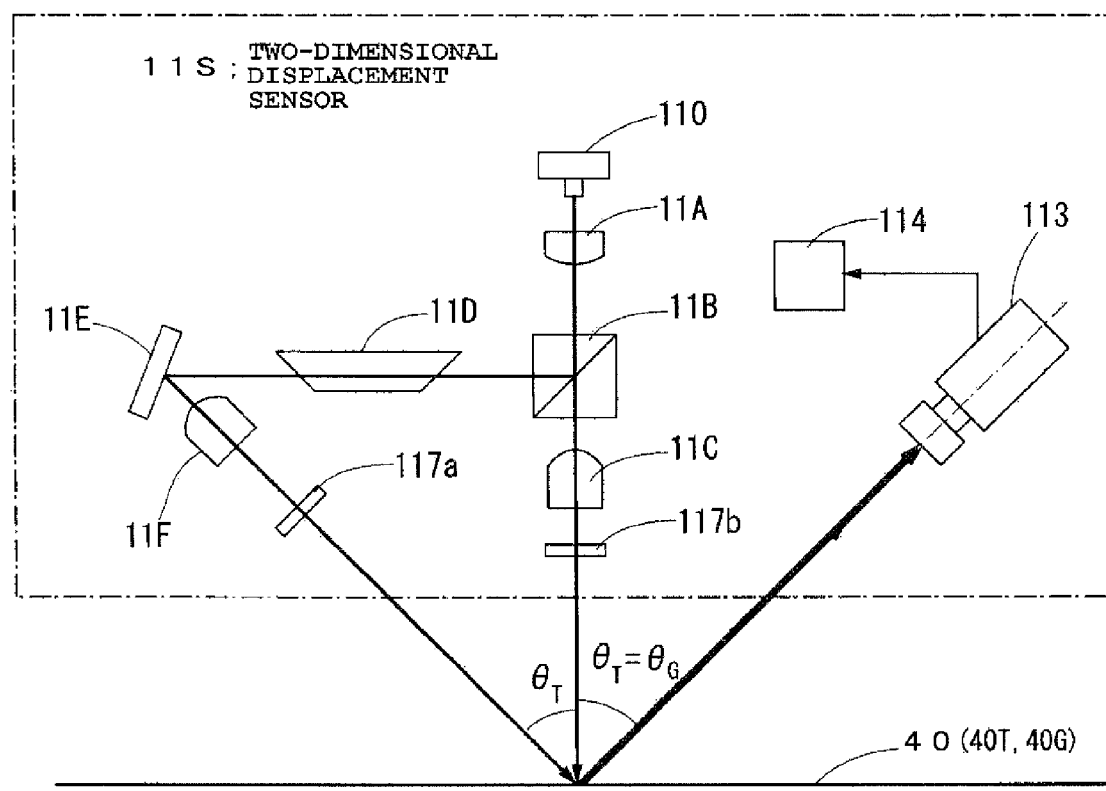
FIG. 6 is an illustration showing a configuration of a two-dimensional displacement sensor according to a third embodiment of the invention.
Figure 7:
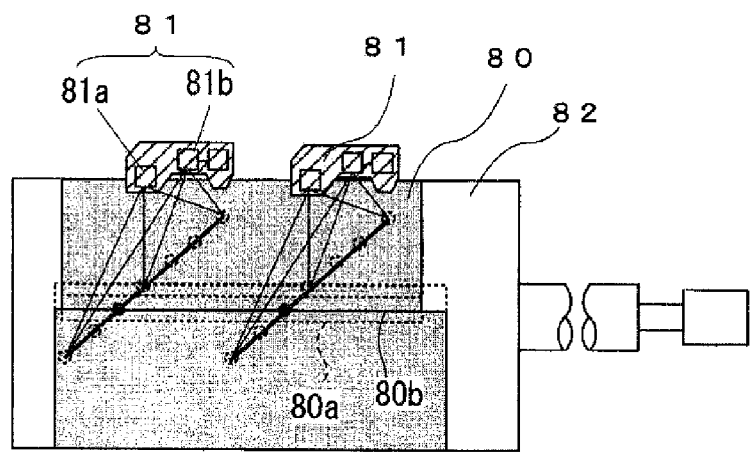
FIG. 7 is an illustration showing a method for end measurement using a conventional two-dimensional displacement sensor.
Figure 8:
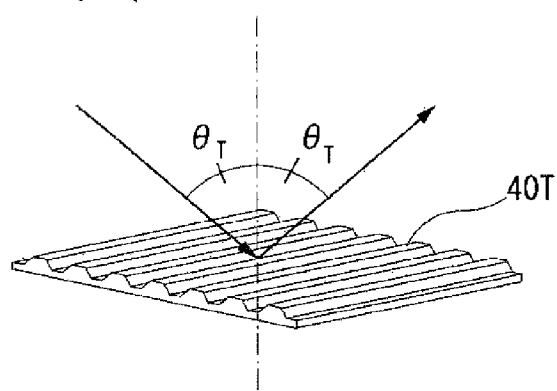
FIG. 8 is illustrations showing the relations between the tire component members and the directions of incident light and reflected light.
Figure 8:
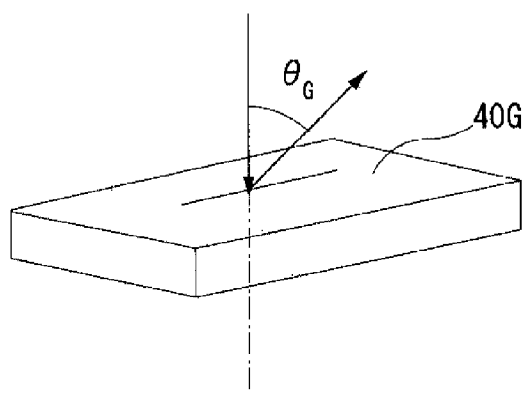

In the first embodiment described earlier, the emission means is constituted by the first and second laser units 111, 112. However, as shown in FIG. 6, the two-dimensional displacement sensor 11S may be structured by using an emission means provided with a laser unit 110 for laser emission and a beam splitter 113 for splitting. Then only one laser unit will be required, thereby simplifying the sensor structure.

The two-dimensional displacement sensor 11S includes a laser unit 110, a collimator lens 11A, a beam splitter 11B for splitting light, a Powell lens 11C for transmitted light, an image rotator 11D, a reflective mirror 11E, a Powell lens 11F for reflected light, liquid-crystal shutters 117a, 117b as electronic shutters, a camera 113, and a measuring unit 114.

The switching means is constituted by the liquid-crystal shutters 117a, 117b and a not-shown shutter control means for controlling the opening and closing of the liquid-crystal shutters 117a, 117b.

It is to be noted that the camera 113 and the measuring unit 114 used are the same as those of the first embodiment, but, in this embodiment, the camera 113 is disposed in a position toward which the first laser light is reflected, or axisymmetrical to the reflective mirror 11E with respect to the direction of laser light from the laser unit 110.

The laser unit 110, located right above the strip-shaped member 40, emits laser light of a predetermined wavelength (e.g., 660 nm).

The collimator lens 11A converts the above-mentioned laser light into parallel light rays.

The beam splitter 11B for splitting light splits the laser light emitted from the collimator lens 11A into transmitted light and reflected light. The transmitted light is the second laser light incident on the surface of the strip-shaped member 40 from a direction parallel to the thickness direction of the strip-shaped member 40.

The Powell lens 11C for transmitted light transforms the second laser light, which is the transmitted light from the beam splitter 11B for splitting light, into a light having nearly even intensity distribution, which is to be incident on the strip-shaped member 40.

The image rotator 11D, located in the emission direction of reflected light from the beam splitter 11B for splitting light, rotates the reflected light around the optical axis by a predetermined angle (90 degrees here) and emits the rotated light to the reflective mirror 11E.

The reflective mirror 11E reflects the reflected light in a direction intersecting the thickness direction of the strip-shaped member 40 (direction of incident angle $\theta_T$ of 45 degrees here). The reflected light from the reflective mirror 11E is the first laser light.

The Powell lens 11F for reflected light transforms the reflected light, which is the first laser light, into a light having nearly even intensity distribution, which is to be incident on the strip-shaped member 40.

The liquid-crystal shutter 117a, located between the Powell lens 11F for reflected light and the strip-shaped member 40, transmits the first laser light in the open state and blocks the first laser light in the closed state. On the other hand, the liquid-crystal shutter 117b, located between the Powell lens 11C for transmitted light and the strip-shaped member 40, transmits the second laser light in the open state and blocks the second laser light in the closed state.

Next, a description will be given of the operation of the two-dimensional displacement sensor 11S.

When the strip-shaped tire component member 40 is a treated member 40T, the first laser light only is emitted to the surface of the treated member 40T, and the amount of displacement of the surface of the treated member 40T is measured, with a not-shown shutter control means setting the liquid-crystal shutter 117a in the open state and the liquid-crystal shutter 117b in the closed state.

The first laser light is the reflected light of laser light from the laser unit 110 reflected by the beam splitter 11B for splitting, which is also reflected by the reflective mirror 11E, and hits the surface of the treated member 40T at an incident angle $\theta_T$ of 45 degrees. Of the reflected light of laser light reflected on the surface of the treated member 40T, the totally reflected light whose angle of reflection $\theta_T$ is 45 degrees is emitted in the direction of the camera 113, where it is focused (forms an image) on the CCD elements thereof.

Thus, the amount of displacement of the strip-shaped tire component member 40 can be measured by the measuring unit 114 which determines the reflected light detecting position in the image captured by the camera 113.

On the other hand, when the strip-shaped tire component member 40 having been conveyed to this point is a non-treated member 40G, the second laser light only is emitted to the surface of the non-treated member 40G, and the amount of displacement of the surface of the non-treated member 40G is measured, by setting the liquid-crystal shutter 117b in the open state and the liquid-crystal shutter 117a in the closed state.

The second laser light is the laser light emitted from the laser unit 110 and having passed through the beam splitter 11B for splitting and is incident on the non-treated member 40G from a direction parallel to the normal direction of the non-treated member 40G as shown in FIG. 6.

Of the scattering light of laser light emitted to the surface of the non-treated member 40G, the scattering light whose angle of reflection $\theta_G$ is 45 degrees is emitted in the direction of the camera 113, where it is focused on the CCD elements thereof. Therefore, the amount of displacement of the strip-shaped tire component member 40 can be measured by the measuring unit 114 which determines the reflected light detecting position in the image captured by the camera 113.

It should be appreciated that the application of the two-dimensional displacement sensors 11, 11Z, 11S of the present invention is not limited to the measurement of the surface shapes of a strip-shaped tire component member 40 wound around the periphery of a building drum 21. For example, they may be applied to the shape measurements of a strip-shaped rubber member, such as the tread, which is extruded from the extruder, cut into a fixed length, and conveyed or a strip-shaped member which is conveyed on a conveyor.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

INDUSTRIAL APPLICABILITY

According to the present invention, the amount of displacement of treated members and non-treated members can be measured without an increase in the number of cameras. Therefore, the length of strip-shaped members can be measured, and the shapes of tire component members can be inspected with excellent efficiency. Thus the inspection accuracy can be improved.

DESCRIPTION OF REFERENCE NUMERALS 10 length measuring apparatus of tire component member
11, 11Z two-dimensional displacement sensor
12 laser drive/control means
13 switching means
14 shape measuring means
21 building drum
22 drum rotating unit
22a speed changer
22b drive motor
23 rotary encoder
24 main shaft of tire building machine
25 building drum control unit
31 conveyor
32 pressing roller
40 strip-shaped tire component member
40T treated member
40G non-treated member
40a starting end
40b terminating end
40c joint portion
111 first laser unit
112 second laser unit
113 camera
114 measuring unit
115 first beam splitter
116 prism
117 liquid-crystal shutter
118 third laser unit
119 second beam splitter
11m first mirror
11n second mirror
11k auxiliary mirror
11P Powell lens
11c collimator lens
11d condensing lens

The invention claimed is:

1. A two-dimensional displacement sensor comprising:
an emitter for emitting first laser light incident on a surface of a strip-shaped member from a direction intersecting a thickness direction of the strip-shaped member and emitting second laser light incident on the surface of the strip-shaped member from a direction parallel to the thickness direction of the strip-shaped member, the emitter includes:
a first laser for emitting the first laser light;
a second laser for emitting the second laser light; and
a third laser disposed in a position symmetrical to the first laser with respect to the second laser;
a displacement measuring unit having a light receiving element for receiving light reflected from the surface of the strip-shaped member and measuring an amount of displacement of the surface of the strip-shaped member from a reflected light receiving position detected by the light receiving element;
an optical element for focusing the reflected light on the light receiving element;
a switch for switching the laser light to be incident on the surface of the strip-shaped member between the first laser light and the second laser light;
a mirror for reflecting the emitted light of the first laser light to be incident from a direction intersecting the thickness direction of the strip-shaped member;
a beam splitter for transmitting the emitted light of the first laser between the first laser and the mirror and reflecting the reflected light of the second laser;
a second mirror for reflecting emitted light from the third laser to be incident from a direction intersecting the thickness direction of the strip-shaped member; and
a second beam splitter for transmitting emitted light from the third laser between the third laser and the second mirror and reflecting reflected light from the first laser,
wherein the first and second laser lights are the laser lights in the form of a line,
wherein the switch drives and controls either one of the first laser and the second laser only, and
wherein the switch drives and controls the third laser when driving and controlling the first laser.

2. The two-dimensional displacement sensor according to claim 1, further comprising an electronic shutter between the beam splitter and the mirror and another electronic shutter between the second beam splitter and the second mirror.

3. An apparatus for detecting a shape of a strip-shaped member comprising:
a two-dimensional displacement sensor as recited in claim 1;
a shifting unit for shifting the two-dimensional displacement sensor relative to the strip-shaped member in the length direction of the strip-shaped member; and
a shape detector for detecting a shape of the strip-shaped member based on the amount of displacement of the strip-shaped member measured by the two-dimensional displacement sensor,
wherein the line formed by the first and second laser lights extends in a direction oblique to the length direction of the strip-shaped member on the surface of the strip-shaped member.

4. The apparatus for detecting a shape of a strip-shaped member according to claim 3, wherein the laser light from the laser light emitter is emitted through a Powell lens.

5. A method for detecting a shape of a strip-shaped member comprising the steps of:
emitting with an emitter first laser light incident on a surface of a strip-shaped member from a direction intersecting a thickness direction of the strip-shaped member and second laser light incident on the surface of the strip-shaped member from a direction parallel to the thickness direction of the strip-shaped member, the emitter includes:
a first laser for emitting the first laser light;
a second laser for emitting the second laser light; and
a third laser disposed in a position symmetrical to the first laser with respect to the second laser;
receiving with a displacement measuring unit having a light receiving element light reflected from the surface of the strip-shaped member and measuring an amount of displacement of the surface of the strip-shaped member from a reflected light receiving position detected by the light receiving element;
focusing with an optical element the reflected light on the light receiving element;

switching with a switch the laser light to be incident on the surface of the strip-shaped member between the first laser light and the second laser light;
reflecting with a mirror the emitted light of the first laser light to be incident from a direction intersecting the thickness direction of the strip-shaped member;
transmitting with a beam splitter the emitted light of the first laser between the first laser and the mirror and reflecting the reflected light of the second laser;
reflecting with a second mirror emitted light from the third laser to be incident from a direction intersecting the thickness direction of the strip-shaped member; and
transmitting with a second beam splitter emitted light from the third laser between the third laser and the second mirror and reflecting reflected light from the first laser,
wherein the first and second laser lights are the laser lights in the form of a line,
wherein the switch drives and controls either one of the first laser and the second laser only, and
wherein the switch drives and controls the third laser when driving and controlling the first laser.

* * * * *